United States Patent [19]

Thoman

[11] Patent Number: 4,892,150
[45] Date of Patent: Jan. 9, 1990

[54] POLYMER HORSESHOE PROVIDING ENHANCED SUPPORT

[76] Inventor: Owen E. Thoman, 20218 Viewcrest Dr., San Jose, Calif. 95120

[21] Appl. No.: 189,315

[22] Filed: May 2, 1988

[51] Int. Cl.$^4$ ............................ A01L 3/00; A01L 5/00
[52] U.S. Cl. .......................................... 168/4; 168/20; 168/DIG. 1
[58] Field of Search ................... 168/4, 17, 20, DIG. 1

[56] References Cited

U.S. PATENT DOCUMENTS

| | | | |
|---|---|---|---|
| 3,283,825 | 11/1966 | Ward | 168/4 X |
| 3,285,346 | 11/1966 | Jenny et al. | 168/4 |
| 3,302,723 | 2/1967 | Renkenberger et al. | 168/4 |
| 3,486,561 | 12/1969 | Kulak | 54/82 X |
| 3,519,079 | 7/1970 | Bieber | 168/4 |
| 3,603,402 | 3/1969 | McDonnell | 168/4 |
| 3,907,036 | 9/1975 | Capone | 168/28 X |
| 4,206,811 | 5/1980 | Dallmer | 168/4 |
| 4,265,314 | 5/1981 | Tovim | 168/4 |
| 4,290,487 | 9/1981 | Unger | 54/82 X |
| 4,513,824 | 4/1985 | Ford | 168/4 |

FOREIGN PATENT DOCUMENTS 3517119 11/1986 Fed. Rep. of Germany .......... 168/4

Primary Examiner—Robert P. Swiatek
Attorney, Agent, or Firm—Thomas Schneck

[57] ABSTRACT

A horseshoe including an arcuate elastomeric shoe body having an upper hoof engaging surface and a lower surface. The upper surface is generally flat and has an arcuate force-bearing recess along the internal periphery disposed to receive a trimmed ridge of the keratinous portion of a hoof. The shoe is thermofit to the animal hoof in order to conform the shoe to the irregularities of the hoof. Upwardly extending tabs from the shoe body contact the outer side wall of the hoof and a quick setting adhesive is applied to the tabs. A non-setting adhesive is applied to the force-bearing recess and the upper surface of the shoe body. The non-setting adhesive is also applied to a sole protective flange which extends inwardly from the shoe body. A tough wear member, resembling an iron horseshoe may be adhered to the elastomeric shoe body.

11 Claims, 2 Drawing Sheets

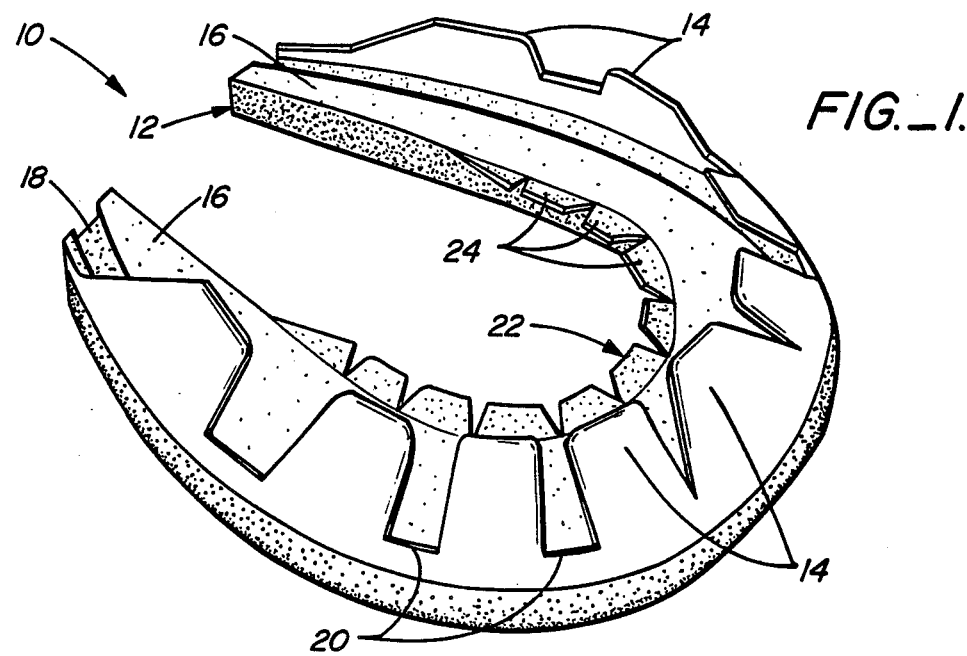
FIG._1.
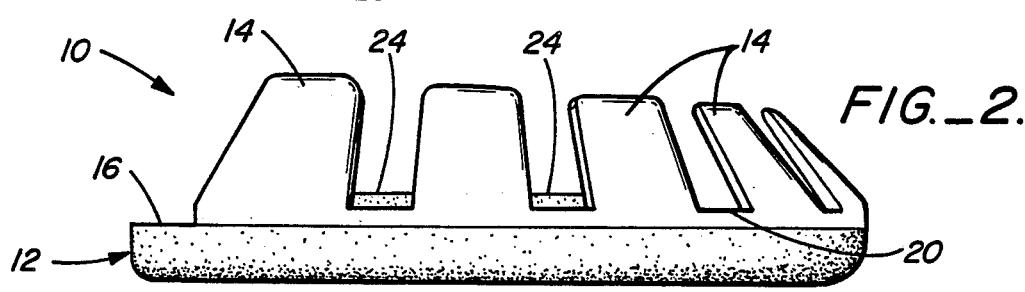
FIG._2.
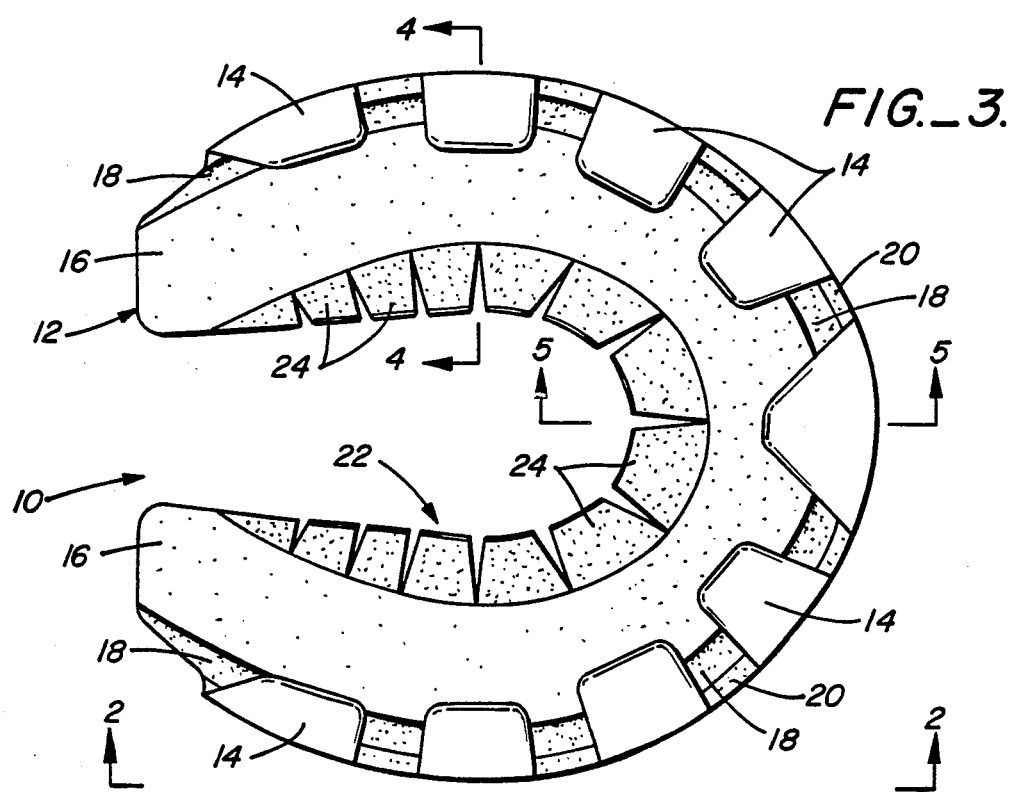
FIG._3.

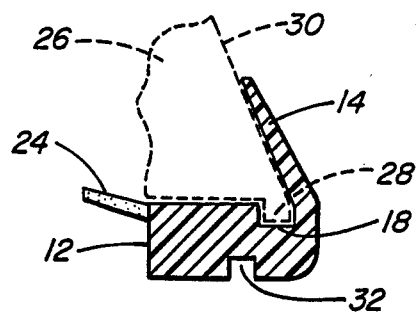
FIG._4.
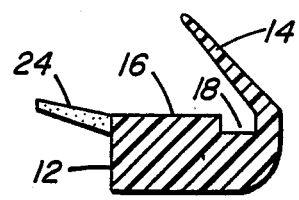
FIG._5.
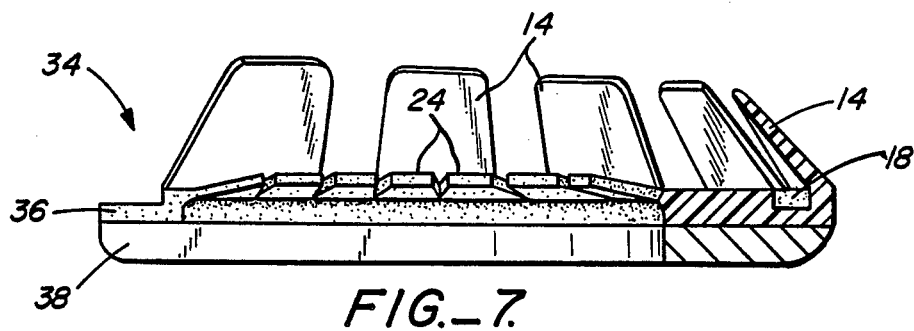
FIG._7.
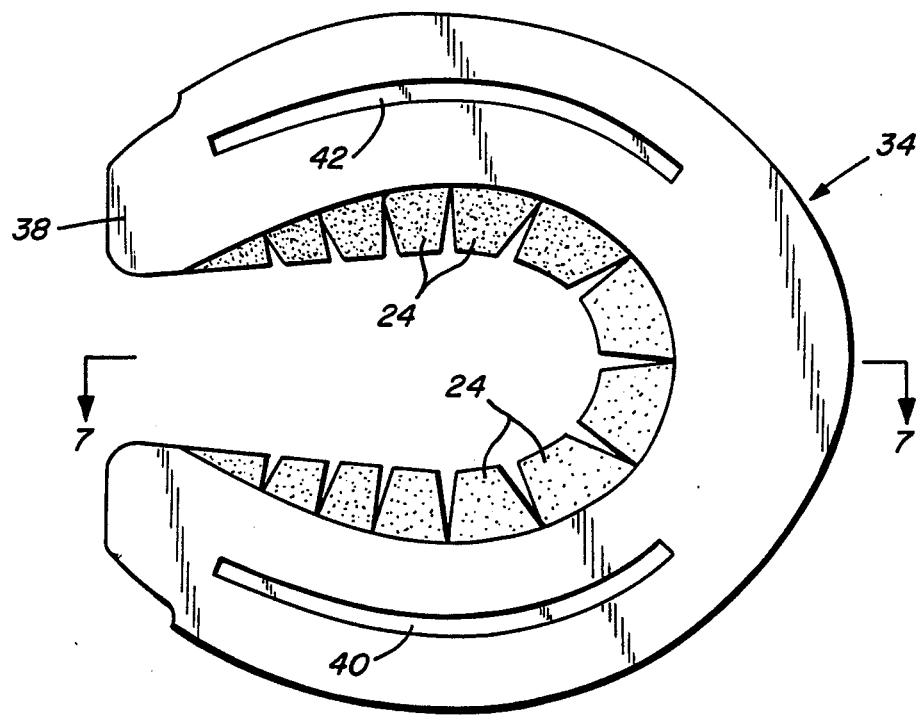
FIG._6.

POLYMER HORSESHOE PROVIDING ENHANCED SUPPORT

TECHNICAL FIELD

The present invention relates generally to hoof protection and particularly to shoes for horses, ponies, mules and the like.

BACKGROUND ART

Conventional horseshoes are constructed of steel, iron or aluminum and are fastened to the underside of a hoof by nails. Such horseshoes have a U-shaped configuration to permit the natural outward movement of the outer side wall of an animal's hoof upon impact with a surface. The spreading is a result of the elastic characteristics of a hoof and is most pronounced at the rear, or heel, of a hoof. This spreading is important to prevention of injuries. While the conventional U-shaped configuration does permit spreading despite the inelastic nature of the metal horseshoe, the conventional horseshoe is heavy and does little to absorb impacts.

Horseshoes are typically secured to a hoof by the driving of nails into the horn wall of the hoof, known as the keratinous portion of the hoof. Great care must be taken in directing the nail into the keratinous portion so as to prevent injury to the animal. The nails are driven in a direction at an angle away from the center of the hoof, with any nail points extending from the outer side wall of the hoof being cut off or hammered against the hoof. Errors made in driving the nails or in hammering nail points may lame an animal.

Horseshoes made of a plastic material are known. Such horseshoes are disclosed in U.S. Pat. Nos. 4,206,811 to Dallmer, 3,603,402 to McDonnell, 3,519,079 to Bieber and 3,302,723 to Renkenberger et al. Dallmer, for example, teaches a plastic horseshoe having a dovetailed groove which receives a metal strip. The metal strip creates a resilient resetting force when the free ends of the horseshoe-shaped plastic body are drawn apart for the purpose of mounting a plastic body on a larger hoof. Plastic horseshoes provide a lighter weight, more comfortable protection to an animal's hoof. Moreover, a plastic horseshoe is more resilient and compressible against a hoof than a conventional metal horseshoe.

One difficulty associated with the use of horseshoes made of a plastic material is that of securely fixing the shoe to a hoof. Typically, the plastic horseshoe is fixed to the hoof by an adhesive. However, because of the mass of a horse, the adhesive bonding is subjected to extreme forces. Dallmer includes a vertically extending wall which may be fixed to the side of the hoof to better prevent rearward sliding of the plastic horseshoe. Adhesively bonded plastic horseshoes, however, are still susceptible to extreme forces which promote forward or lateral movement of the horseshoe relative to the hoof. Additionally, the choice of adhesive is critical. The adhesive may cause irritation of the hoof, thereby promoting "hoof rot", or thrush, in the white line area of the hoof.

U.S. Pat. No. 3,285,346 to Jenny et al. teaches a method of producing an elastic horseshoe directly onto an animal's hoof. The hoof is drilled with a number of bores and then placed in a mold. Plastic material is then inserted into the mold. After hardening of the material, the mold is removed. While this method eliminates the need of adhesive, the drilling of bores into the hoof entails many of the same dangers involved with the nailing of shoes onto a hoof.

It is an object of the present invention to provide a plastic horseshoe and a method of affixing the plastic horseshoe to the hoof of a horse, mule or the like without risk of injury to the animal. It is a further object to provide such a shoe which guards against dislodgment regardless of the direction of frictional force on the shoe relative to the hoof.

DISCLOSURE OF THE INVENTION

The above objects have been met by the thermal fitting of a flexible polymer horseshoe which is bonded to a hoof by both a quick-setting adhesive applied at a first area of the shoe and a non-setting oil-based adhesive applied a force-bearing area which receives a trimmed ridge of the hoof to guard against dislodgment of the shoe. The shoe has an arcuate body having an upper hoof-engaging surface and a lower surface. The hoof-engaging surface is generally flat but has an arcuate force-bearing recess. The recess extends along the internal periphery of the shoe body and has a width which accommodates the horny wall of the hoof. This horny wall is referred to as the keratinous portion of the hoof.

A non-setting oil-based adhesive is deposited within the force-bearing recess of the shoe and along the upper hoof-engaging surface which is then brought into contact with the sole of a hoof. A trimmed ridge on the keratinous portion fits within the force-bearing recess. The shoe body also includes an interior protecting flange which extends inwardly to protect the sole of the hoof. The protective flange also provides additional area for application of the non-setting adhesive. The shoe body, although made of a tough polymer having elastic properties, may be adhered to a conventional iron horseshoe for greater wear qualities.

A plurality of securing tabs extend upwardly from the shoe body to act as an outer wall for the forcebearing recess. The securing tabs are disposed for contact with the outer side wall of the keratinous portion of the hoof. A quick setting adhesive is placed between the securing tabs and the keratinous hoof portion. The adhesively bonded securing tabs prevent the shoe body from sliding to the rear of the hoof, while the forcebearing recess protects against dislodgment of the shoe body due to forces having components other than those which push the shoe body rearwardly.

The shoe may be produced by a reaction-injection mold method or other suitable methods. The material must be flexible, high-impact material, preferably non-foam urethane. The material is cutable so as to permit a farrier to match the length of the shoe with the length of the hoof to be covered. The flexibility of the shoe permits the generally flat hoof-engaging surface of the shoe to meet the contour of a particular hoof. The keratinous portion of the hoof must be trimmed to provide a fitting into the force-bearing recess of the shoe body. Preferably, the shoe is thermo-fitted to the hoof to insure a better fit.

An advantage of the present invention is that the shoe is expandable to conform to hoof expansion resulting from impact with a ground surface or from normal growth. Moreover, a fungicide is added to the adhesive to fight against thrush and other diseases at the white line area of the hoof.

Another advantage of the present invention is that thermo-fitting of the flexible shoe permits the shoe to match the contour of various hooves. This along with the force-bearing recess provides a secure attachment of the shoe to a hoof.

BRIEF DESCRIPTION OF THE DRAWINGS

FIG. 1 is a perspective view of a horseshoe in accord with the present invention.

FIG. 2 is a side view of horseshoe of FIG. 1.

FIG. 3 is a top plan view of the horseshoe of FIG. 2.

FIG. 4 is a front cross-sectional view of the horseshoe of FIG. 3 taken along lines 4—4.

FIG. 5 is a side sectional view of the horseshoe of FIG. 3 taken along lines 5—5.

FIG. 6 is a bottom plan view of a second embodiment of the present invention.

FIG. 7 is a side cross-sectional view of the horseshoe of FIG. 6 taken along lines 7—7.

BEST MODE FOR CARRYING OUT THE INVENTION

With reference to FIGS. 1–3, a horseshoe 10 is shown having a shoe body 12 and upwardly extending securing tabs 14. The upper surface 16 of the shoe body 12 is a hoof-engaging surface, while the securing tabs 14 contact the outer side wall of an animal's hoof.

The hoof-engaging surface 16 of the shoe body 12 dimensionally simulates the keratinous portion of the hoof. An arcuate force-bearing recess 18 extends along the outer edge of the upper surface 16. The securing tabs 14 and lips 20 which join adjacent securing tabs form the exterior wall of the force-bearing recess. A protective flange 22 extends inwardly from the shoe body 12 beyond the keratinous portion of the hoof in order to provide protection for the hoof sole. The sole of a hoof is more flexible than the keratinous portion and, consequently, the protective flange is serrated to form leaves 24.

Referring generally to FIGS. 3–5 but particularly to FIG. 4, prior to use of the horseshoe 10 the hoof 26 of the animal must be trimmed to create a ridge 28 that will fit within the force-bearing recess 18 of the shoe body 12. The contact of the trimmed ridge 28 with the force-bearing recess 18 provides protection against dislodgement of the horseshoe from the hoof 26 regardless of the direction of horizontal force exerted on the horseshoe relative to the hoof.

The horseshoe 10 is a reaction injection molded thermal plastic. The material must be durable and therefore must be a high impact material. Preferably, the horseshoe is made of a non-foam urethane, having an elastomeric quality, so that the shoe yields to impact and may be twisted slightly by hand when not attached to an animal. The horseshoe is therefore a flexible body which can be flexed to match the contour of a hoof. The flexibility insures maximization of contact area between the horseshoe and the hoof. Moreover, the horseshoe is expandable to conform to hoof expansion upon impact with a ground surface. The hoof of an animal is permitted to spread when experiencing impact, thereby safeguarding against injuries which are caused by horseshoes which retard the natural spreading of the hoof.

After the animal's hoof 26 has been trimmed to provide ridge 28, the shoe body 12 is brought into contact with hoof. A first adhesive is applied between the securing tabs 14 and the outer side wall 30 of the hoof 26. This first adhesive is a quick set adhesive which preferably sets in a time not to exceed 2 minutes. Fixing of the securing tabs to the hoof prevents rearward motion of the shoe relative to the hoof.

A second adhesive is applied between the bottom of the hoof 26 and the hoof engaging surface of the shoe body 12. The second adhesive is a non-setting oil based adhesive, typically a rubber-petroleum composite. The non-setting adhesive provides a barrier against moisture and foreign matter, and is not contaminated or loosened by the natural hoof oil. Optimally, the second adhesive contains a material to reduce bacterial growth which would otherwise cause thrush and other diseases in the white line area of the hoof. In practice, the second adhesive is applied first, followed by application of the first adhesive.

The shoe body 12 is thermally fit to the hoof 26. By applying the horseshoe to the hoof while the shoe body is in a warm state, an optimal fit between the shoe body and the complex contour of the hoof is insured. The second, non-setting, adhesive is also applied between the leaves 24 of the protective flange 12 and the sole of the hoof 26. Thus, the present invention provides a large adhesive area. The quick setting adhesive is deposited at the securing tabs 14, while the non-setting adhesive resides in the force-bearing recess 18, the hoof-engaging surface of the shoe body 12, and the leaves 24.

The force-bearing recess 18 is preferably 0.125 inches deep relative to the hoof-engaging surface 16 and has a width of approximately 0.37 inches, extending around the interior periphery of the shoe and downwardly into the body of the shoe. Such dimensions provide a sufficiently strong trimmed ridge 28 of the hoof 26. The bottom surface of the shoe body 12 shown in FIG. 4 includes a groove 32. Alternatively, the bottom of the shoe body may be injection molded to include ridges or may have any of the various configurations known in the art for providing traction during various types of animal activity.

Referring now to FIGS. 6 and 7, a second embodiment of a horseshoe 34 is shown. The second embodiment includes the securing tabs 14, the leaves 24 of the protective flange, and the force-bearing recess 18 also found on the first embodiment. However, the horseshoe 34 has a shoe body 36 which is significantly smaller in height than the shoe body of the first embodiment. Instead, a wear member 38 is sealed, as by adhesive, to the lower surface of the shoe body 36. The wear member 38 is typically made of aluminum, steel or iron and may resemble or be a standard iron horseshoe in shape, size and weight. While it is not critical that the wear member be metallic, the wear member should have a hardness exceeding the hardness of the shoe body 36. Sealing of the wear member to the shoe body increases the durability of the horseshoe. As shown in FIG. 6, the wear member includes traction grooves 40 and 42 at a lower surface.

Again, in use the reaction injection molded urethane shoe body 36 is applied to the hoof of an animal while in a warm condition, thereby permitting the shoe body to form to the contour of the hoof. The animal hoof is trimmed to include a ridge which fits into the force-bearing recess 18. Because the shoe body 36 is made of a plastic material, it is possible to cut the material to the length of the hoof.

A quick setting adhesive is applied between the securing tabs 14 and the outer side wall of the hoof after a non-setting oil base adhesive has been applied to the force-bearing recess, the upper surface of the shoe body 36 and to the leaves 24 of the serrated protective flange. Thus, the large adhesive areas, along with the contact of the force-bearing recess with the trimmed ridge of a hoof, guard against dislodgement even when subjected to the extreme forces experienced during running by a horse.

The present invention describes a comfortable, safe and secure method of shoeing the hoof of an animal. While the invention has been described as a horseshoe, it is understood that the present invention may be used in the shoeing of mules and other animals having hooves.

I claim:

1. A horseshoe comprising,
   a flexible plastic shoe body having a hoof-engaging top surface and a bottom surface generally parallel to said top surface, said top surface having an arcuate force-bearing depression shaped and disposed to receive a keratinous portion of an animal hoof, said force-bearing depression extending along at least a majority of said shoe body, said force-bearing depression having a generally rectangular shape having sharp corners,
   a plurality of securing tabs projecting upwardly from said shoe body for contact with an outer side wall of said horse hoof, said securing tabs forming an outer wall of said force-bearing depression,
   a first bonding means for adhesively fixing said securing tabs to said outer side wall, and
   a second bonding means for adhesively fixing said shoe body to said hoof.

2. The horseshoe of claim 1 further comprising a wear member adhesively attached to the bottom surface of said shoe body.

3. The horseshoe of claim 1 further comprising a protective flange projecting inwardly from said shoe body for contact with the sole of a hoof.

4. The horseshoe of claim 3 wherein said protective flange is serrated.

5. The horseshoe of claim 1 wherein said first bonding means ia a quick setting adhesive and the second bonding means is a non-setting oil base adhesive.

6. A shoe for an animal hoof of the type having a keratinous portion having an arcuate length and an outer side wall, comprising,
   an arcuate shoe body having an upper hoof-engaging surface and a lower surface, said upper surface being a generally flat surface having an arcuate forcebearing recess partially defined by said lower surface adjoining an inner wall extending downwardly from said generally flat upper surface and an outer wall formed by a plurality of securing tabs extending upwardly from said shoe body, said securing tabs disposed to contact the outer side wall of the keratinous portion of a hoof, said recess of the upper surface having a depth, width and position matching the lowermost portion of a keratinous rim of a hoof, said shoe body being made of a flexible, high impact material, and
   an adhesive means for fixing said shoe body to said hoof, said adhesive means including a first and a second adhesive, said first adhesive being a quick set adhesive for deposition between said securing tabs and said outer side wall, said second adhesive being a nonsetting oil based adhesive for deposition between said hoof and said hoof-engaging surface of the shoe body.

7. The shoe of claim 6 wherein said shoe body includes an interior protective flange extending inwardly in a direction away from said force-bearing recess and extending beyond said keratinous portion of the hoof.

8. The shoe of claim 6 wherein said shoe body is made of a non-foam urethane.

9. The shoe of claim 6 wherein said recess has a width in the range of 0.1 inches and 0.5 inches and has a depth relative to said hoof-engaging surface in the range of 0.07 inches and 0.25 inches.

10. The shoe of claim 6 further comprising a wear member having a hardness exceeding the hardness of said shoe body, said wear member adhesively fixed to the lower surface of said shoe body.

11. The shoe of claim 10 wherein said wear member has a configuration similar to the configuration of said lower surface of the shoe body and is made of a material in the class of steel, aluminum and iron.

* * * * *